United States Patent [19]

Mizusawa

[11] 4,312,165
[45] Jan. 26, 1982

[54] BRACKET FOR HEAD OF PANEL FASTENER

[75] Inventor: Akira Mizusawa, Fujisawa, Japan

[73] Assignee: Nifco, Inc., Yokohama, Japan

[21] Appl. No.: 78,987

[22] Filed: Sep. 26, 1979

[30] Foreign Application Priority Data

Oct. 3, 1978 [JP] Japan .......................... 53-135104[U]

[51] Int. Cl.³ .............................................. E04B 1/38
[52] U.S. Cl. ...................................... 52/511; 52/512;
411/57; 411/510
[58] Field of Search ....................... 52/511, 512; 85/72

[56] References Cited

U.S. PATENT DOCUMENTS

| | | | |
|---|---|---|---|
| 2,898,258 | 8/1959 | Meier et al. | 52/511 |
| 2,956,468 | 10/1960 | Macy | 85/72 |
| 3,216,166 | 11/1965 | Brown | 52/511 |
| 3,238,686 | 3/1966 | Pomeroy | 52/511 |
| 3,671,061 | 6/1972 | Dawdy | 52/511 |
| 3,765,295 | 10/1973 | Ptak | 85/72 X |
| 3,771,275 | 11/1973 | Seckerson | 52/511 |
| 3,894,377 | 7/1975 | Welch | 52/511 X |

Primary Examiner—Alfred C. Perham
Attorney, Agent, or Firm—J. R. Halvorsen; T. W. Buckman

[57] ABSTRACT

A bracket for receiving and retaining in position the head portion of a panel fastener for joining two panels or other similar articles. The apparatus comprises (i) a bracket member provided with a seat portion for engagement with the head portion of the panel fastener and base plate portions adapted for intimate contact with the surface of a first panel and containing fitting holes and (ii) pin-insertion type fasteners. Desired attachment of the two panels is accomplished by placing the bracket member so that the fitting holes in the base plate portions thereof coincide with the fitting holes in the first panel, inserting the pin-insertion type fasteners one each into the two coinciding pairs of fitting holes, pushing the drive pins home and thereby causing the bracket member to be attached to the first panel through the medium of the pin-insertion type fasteners, thereafter bringing the head portion of the panel fastener into engagement with the seat portion of the bracket member and attaching the shank portion of this panel fastener to the other panel.

2 Claims, 9 Drawing Figures

PRIOR ART
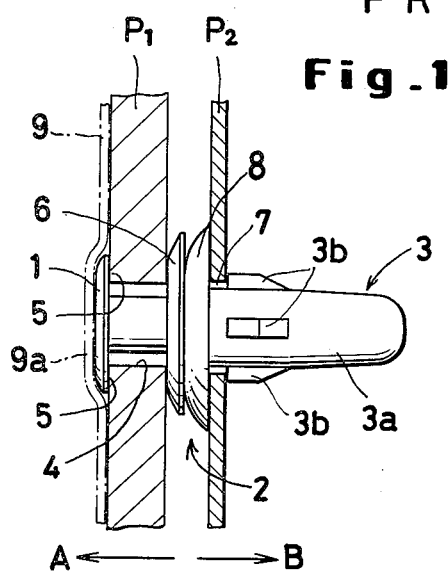
Fig.1
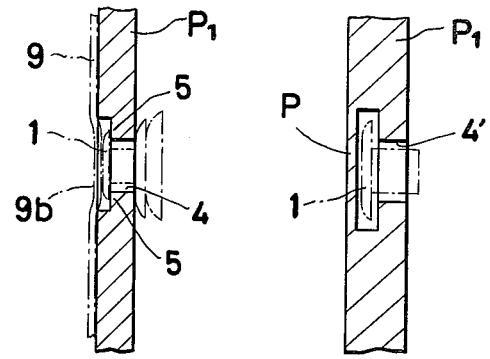
Fig.2(A)  Fig.2(B)
Fig.3(A)
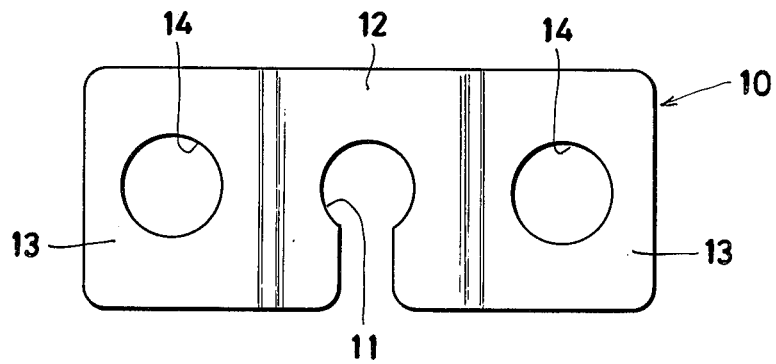
Fig.3(B)
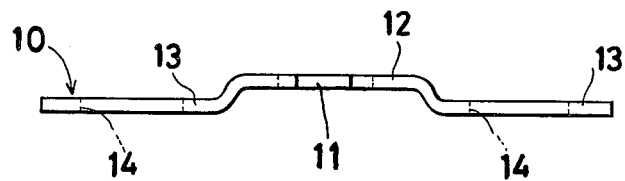

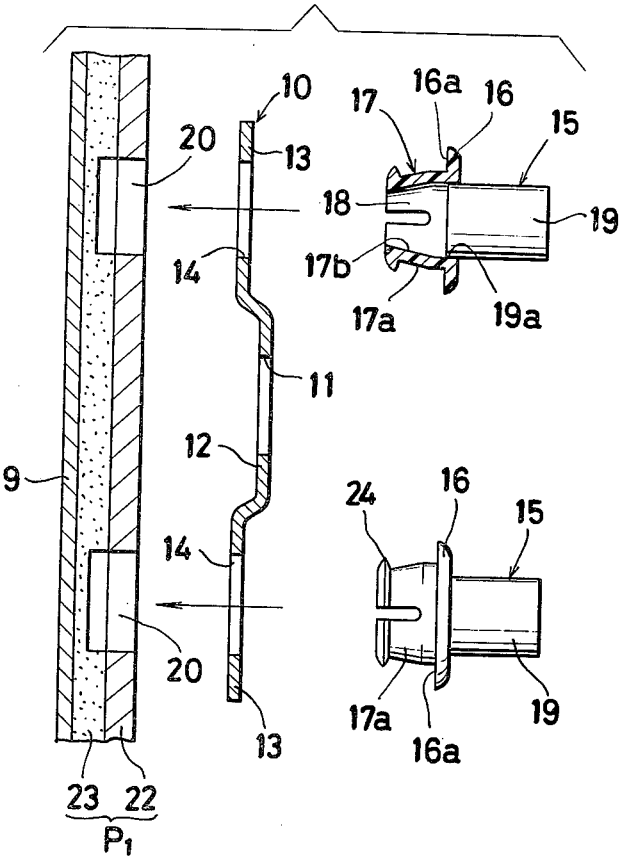
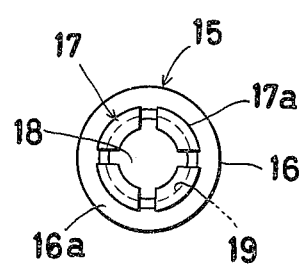
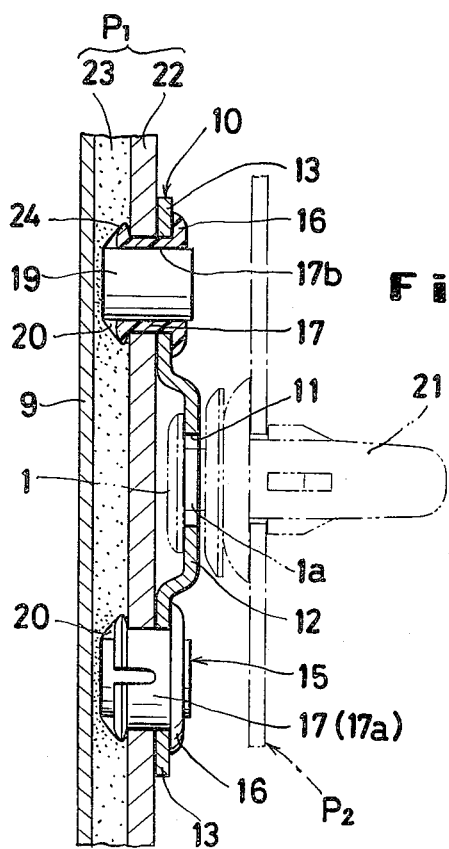
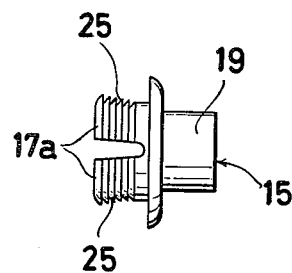

BRACKET FOR HEAD OF PANEL FASTENER

BACKGROUND OF THE INVENTION

This invention relates to a bracket which permits effective use of a plastic fastener in joining two panels or other similar articles, and more particularly to a bracket which receives and retains the head of the plastic fastener in position with reference to the weaker of the two panels being joined.

Plastic fasteners are now in general use for attaching trim boards (inner decorative boards) to the inner panels of car doors etc. Although these plastic fasteners come in various types, all comprise at least a head portion, a shank portion extending from the head portion and elastic engaging means provided on the shank portion. With such a plastic fastener, desired union of a trim board with an inner panel in an automobile door has been accomplished by first bringing the head portion of the plastic fastener into secure attachment to a corresponding seat formed in advance on the trim board, then causing at least a part of the shank portion thereof to enter a fitting hole formed in advance at the corresponding position in the inner panel of the door and finally allowing the elastic engaging means on the shank portion to slide past the fitting hole and snap into fast engagement with the opposite edge of the fitting hole.

For use in conventional automobile doors, the inner panels have been naturally made of a metallic material and have therefore enjoyed ample rigidity to withstand the forces acting thereon through the elastic engaging means and, on the other hand, the trim boards have been made of hardboard and the seating portions thereof serving to hold the heads of the plastic fasteners have had high rigidity. The seating portions of the trim boards, therefore, have been capable of retaining the heads of the fasteners in fast attachment thereto even when great force is exerted as if to pull the fasteners out of the seating portions of the trim boards.

In recent years, trim boards made of solid synthetic resin material or foamed synthetic resin material have been widely adopted. Although these boards facilitate fabrication, they are vulnerable to local stress. Still, their material permits easy formation of aesthetically curved surfaces as are required by trim boards of automobile doors and enables arm rests and other accessorial items to be integrally molded with the trim boards. It is because of these merits that the material has come to find wide acceptance.

When a trim board made of such a relatively weak material is attached to a metallic panel, there is a possibility that the seat portion of the trim board serving to retain in position the head of a fastener keeping the trim board attached to the panel will break and the trim board will consequently come off the metallic panel.

An object of the present invention is to provide a bracket for receiving and retaining in position the head of a panel fastener, which bracket is constructed so that even when the panel (trim board) to be kept in contact with the head of the fastener is made of a plastic material or a foamed plastic material and suffers from local weakness, the stress generated where the panel seats the fastener will be dispersed to the extent of precluding the possible breakage of the seat portion.

Another object of this invention is to provide a bracket for receiving and retaining in position the head of a panel fastener which bracket is constructed so as to be easily attached to the back surface of the panel without impairing the appearance of the front surface of the panel.

SUMMARY OF THE INVENTION

To accomplish the objects described above according to the present invention, there is provided a bracket for receiving and retaining in position the head of a fastener of the type used for joining two panels of other similar articles to each other, which bracket comprises (i) a bracket member of ample rigidity composed of a seat portion adapted to retain in fast engagement therewith the head portion of the panel fastener and a base plate portion adapted for fast contact with the surface of a first panel and containing fitting holes therein and (ii) pin-insertion type fasteners each composed of a drive pin and a hollow flanged shank serving as a receptable for the drive pin and having a plurality of barrel elements collectively forming a leading free end of the shank so that when the shank is set in place within the fitting hole in the base plate of the bracket member and the drive pin is pushed down into the shank, the plurality of barrel elements are spread out and pressed against the edge of the fitting hole on the opposite side.

Attachment of the bracket member to the first panel is accomplished by having fitting holes bored to a given depth in the first panel at positions corresponding to the fitting holes in the base plate portion of the bracket member, admitting the hollow flanged shanks of the pin-insertion type fasteners into the fitting holes in the base plate portions until the flanges come to rest on the edges of the fitting holes, inserting the barrel elements of the aforementioned hollow flanged shanks into the fitting holes in the first panel and pressing the drive pins down into the cavities encircled by the barrel elements.

Since the panel fastener is attached to the first panel through the medium of the bracket member as described above, the attachment of the fastener can be safely obtained even when the first panel is made of a weak material. The susceptibility of the surface of the outer panel to damage by the fastener is precluded by making the fitting holes in the first panel blind holes.

The other objects and characteristics of the present invention will become apparent from the further disclosure of the invention to be given hereinbelow with reference to the accompanying drawings.

BRIEF EXPLANATION OF THE DRAWING

FIG. 1 is a sectioned side view illustrating two panels joined to each other by use of a conventional panel-to-panel fastener;

FIG. 2(A) is a sectioned side view illustrating the state in which the head of the conventional panel-to-panel fastener is retained in engagement with the panel;

FIG. 2(B) is an imaginary sectioned side view of the state in which the head of the panel-to-panel fastener obtains engagement with the panel;

FIG. 3(A) is a plan view illustrating one embodiment of the bracket member of the bracket according to this invention;

FIG. 3(B) is a side view of the bracket member shown in FIG. 3(A);

FIG. 4 is a partially sectioned side view illustrating the component parts of the bracket of this invention prepared for attachment to a panel;

FIG. 5 is a bottom view of one embodiment of the pin-insertion type fastener to be used for attachment of the bracket member of the bracket of this invention to a panel;

FIG. 6 is a sectioned side view illustrating the condition in which the bracket of FIG. 4 is attached to the panel; and FIG. 7 is a side view illustrating another embodiment of the pin-insertion type fastener to be used for attachment of the bracket member of the bracket of the present invention to the panel.

DESCRIPTION OF PREFERRED EMBODIMENTS

FIG. 1 illustrates a typical application of a conventional panel-to-panel fastener for the attachment of a trim board to a panel.

This fastener consists at least of a head portion 1, a shank portion 2 extending from the head portion and elastic engaging means 3 formed on the shank portion. In the case of the illustrated fastener, the elastic engaging means 3 is molded of an elastic material in a construction wherein a cylindrical portion 3a is internally hollowed enough to be radially contracted inwardly by virtue of elasticity and engaging ribs 3b protrude outwardly from a total of about four spaced locations on the peripheral surface of the cylindrical portion.

Here, the panel $P_1$ which is to be engaged with the head portion 1 of the panel-to-panel fastener is assumed to be a trim board and the panel $P_2$ to be engaged with the elastic engaging means 3 is assumed to be an inner panel of an automobile door. In FIG. 1, therefore, the lefthand side represents the front surface viewed by the passengers and the righthand side the back surface inside the door.

First, the fastener must be attached to the trim board (panel $P_1$). This attachment is accomplished by posing the head portion 1 on the reverse side of the panel $P_1$ just in front of a fitting hole 4 bored in advance in the panel and causing the head portion 1 to penetrate through the fitting hole 4 in the direction of the arrow "A" indicated in the diagram until it emerges from the outlet edge of the fitting hole 4 (the opening edge of the fitting hole on the outer side of the panel). The fitting hole 4 may be guitar shaped or may be a mere perforation slightly smaller in diameter than the head portion 1, depending on the particular fastener being actually used. In any case, the head portion 1 of the fastener comes into fast engagement with the outer periphery 5 (seat) of the fitting hole to complete the attachment of the fastener to the panel $P_1$.

When a force is applied thereafter in the direction of withdrawing the panel $P_1$ as indicated by the arrow "A" or in the opposite direction of withdrawing the fastener as indicated by the arrow "B", the force simply enhances the pressed contact between the seat 5 and the head portion 1 and prevents the two members from disengagement. In the case of the fastener cited above, there is additionally provided a flange 6 which is in contact with the back surface of the panel $P_1$ and thereby pinches the panel in cooperation with the head portion 1. Depending on the construction of this fastener, the addition of this flange may be omitted.

The fastener which has been attached to the panel $P_1$ as described above is now moved in conjunction with the panel $P_1$ toward a fitting hole 7 bored in advance in the panel $P_2$ in the direction indicated by the arrow "B" and pushed into the fitting hole. In the case of the illustrated fastener, during the passage of the fastener through the fitting hole 7, the cylindrical portion 3a of the elastic engaging means 3 radially contracts inwardly in order for the ribs 3b formed on the peripheral surface thereof to slide on the interior of the fitting hole 7 in the panel $P_2$. On completion of the slide on the interior of the fitting hole 7, the ribs 3b resume their original shape and come into fast engagement with the opposite edge of the fitting hole 7. The opposite surface of the panel $P_2$ is retained in position by means of a flange 8 of the shape of a suction disc. In fasteners other than the illustrated fastener, this flange and the elastic engaging means 3 may be in different forms so long as they fulfill substantially the same functions as those described above.

So far as the panel $P_1$ possesses sufficient rigidity, the seat 5 of the panel with which the head portion 1 of the fastener is engaged is self-retaining enough to prevent the head portion 1 and the seat 5 from being disengaged from each other even when a considerable amont of stress is exerted between the fastener and the panel $P_1$ and consequently between the panels $P_1$ and $P_2$.

Recently, solid synthetic resin materials and foamed synthetic resin materials have come to be widely used for the production of trim boards (corresponding to the panel $P_1$ in the present case). With such boards, the seat 5 of the panel fails to possess sufficient rigidity. The fastener under discussion, therefore, entails a disadvantage that a stress exerted between the head portion 1 and the seat 5 may break the seat 5 possibly to the extent of causing disengagement of the head portion 1 from the seat 5.

It is clear from the foregoing description that the conventional panel-to-panel fastener can be used only when the material of which the panel $P_1$ is made possesses high enough rigidity to retain the head portion of the fastener safely in position and that the fastener cannot be effectively used where the panel $P_1$ is made of a material vulnerable to local stress.

Apart from the problem of the rigidity of the material of the panel, the seat portion of the panel $P_1$ itself entails problems of a different kind. One of these problems occurs when the surface of the panel $P_1$ is covered with a decorative sheet 9 (indicated by a chain line in FIG. 1) such as leather or vinyl sheet, for example. It is a very common practice to apply decorative sheets of such sort to the exposed surfaces of panels joined with fasteners, including the trim boards cited above by way of illustration, for the purpose of conferring aesthetic effects upon the panel surfaces or concealing the heads of fasteners. With the conventional panel-to-panel fastener, since the head of the fastener protrudes from the front surface of the panel $P_1$ as shown in FIG. 1, the protruding head forms a stepped portion 9a on the surface of the panel and impairs the appearance of the panel even if a sheet 9 is applied for the purpose of concealing the head of the fastener.

If, for the purpose of avoiding this trouble, the fitting hole 4 is formed in the panel $P_1$ in a stepped construction as shown in FIG. 2(A) and the seat 5 is shifted to the stepped portion of the fitting hole so that the head portion 1 of the fastener is completely buried below the outer surface of the panel $P_1$, there is formed a recess between the surface of the panel and the upper surface of the head portion 1. When the sheet 9 (indicated by a chain line) is attached to the surface of the panel, a recess 9b still occurs in the applied sheet to impair the appearance of the panel surface. The occurrence of such a recess may be avoided by having the fitting hole 4 countersunk so that the upper surface of the head portion 1 becomes flush with the surface of the panel. This, however, entails an extremely rigid, actually impracticable tolerance in fabrication.

The problem of the nature described above does not occur when the stepped fitting hole is formed in such a manner as to leave the portion $P_1'$ on the front side of the panel in an unbored state as illustrated in FIG. 2(B). Actually, however, it is impossible to have such a stepped blind hole 4' with the larger diameter on the innermost side formed within the panel wall.

Further, apart from the problem of appearance, with the conventional fastener which entails the use of the seat portion of the aforementioned construction, there is involved a disadvantage that the decorative sheet 9 cannot be applied to the panel until the panels have been joined with the fastener. This is because the head portion 1 is not allowed to protrude from the surface of the panel after the decorative sheet 9 has been attached to the panel.

This invention has been developed with a view to overcoming the disadvantages touched upon above. It primarily aims to provide a bracket so constructed as to permit effective dispersion of the stress developed in the panel with which the head portion of the fastener is engaged even when the panel is locally weak as in the case of a panel made of a foamed synthetic resin material. Thus, the bracket of this invention is adapted to utilize, as one major feature, the ease of attachment afforded by the conventional fasteners of the type described above.

The bracket for receiving and retaining in position the head portion of a panel fastener will be described with reference to one embodiment illustrated in FIGS. 3 to 6.

The bracket according to the present invention comprises a bracket member which possesses a seat portion for engagement with the head portion of the panel fastener of the aforementioned construction and pin-insertion type fasteners which serve to permit attachment of the bracket member to the panel.

The bracket member 10 comprises a seat portion 12 which possesses a fitting hole 11 serving, similarly to the aforementioned fitting hole 4, to retain in position the head portion of the fastener to be used and base plate portions which are each adapted to permit intimate contact thereof with the surface of the panel as described in further detail later. In this case, there are a pair of base plate portions disposed one each on the opposite sides of the seat portion. The seat portion is integrally formed with these base plate portions on a level slightly raised above the level of the base plate portions. The bracket member 10 of such a construction is formed of a metallic material or some other similar material possessing ample rigidity as by pressing, for example. The base plate portions 13 have holes 14 perforated one each for permitting insertion therethrough of the fasteners. These holes 14 may be punched out at the time that the bracket member 10 is shaped by pressing.

FIG. 4 illustrates the bracket member 10, the panel $P_1$ and the fasteners 15 serving to attach the bracket member 10 to the panel $P_1$. In this case, there are used a total of two fasteners 15, one for each base plate portions 13. To render the illustration more understandable, one of the two fasteners is shown in its side view and the other in its sectioned view.

Each of the fasteners may be a known plastic pin-insertion type fastener. The fastener will be described with reference to the diagram of FIG. 4.

The fastener 15 itself comprises a flange 16 the bottom surface of which extends past the boundary of the through hole 14 in the base plate portion 13 and a barrel portion 17 which extends from the bottom surface 16a of the flange 16 and contains therein a perforation 18 terminating at the flange 16. The barrel portion 17 will be described with additional reference to the bottom view of FIG. 5. This barrel portion 17 comprises at least two barrel elements 17a possessing free leading ends and formed by insertion of as many vertical slits at spaced locations, e.g. four barrel elements by insertion of four vertical slits at fixed angular intervals of 90° as in the illustrated embodiment. The overall inner wall 17b of the barrel portion 17 is formed with the inside diameter thereof gradually decreased in the direction of the perforation 18 toward the free ends of the barrel elements 17a.

A cylindrical drive pin 19 with an inside diameter substantially equal to the inside diameter of the flange side opening of the perforation 18 constitutes another component of the fastener 15. Insertion of this drive pin 19 into the perforation 18 through the flange side opening thereof causes the barrel elements 17a to be diverged radially. This drive pin 19 may be formed separately of the other components of the fastener 15. It may otherwise be formed integrally with the rest of the components of the fastener, with the lower end thereof connected via a slightly inserted portion 19a to the neighborhood of the flange 16 as shown in FIG. 4. The drive pin 19 thus formed, therefore, can be torn off the inner wall of the flange when it is pushed down or driven in with a hammer. From the standpoint of actual use, the fastener containing an integrally formed drive pin proves very convenient because it precludes the otherwise possible loss of the drive pin and averts the trouble otherwise experienced in correctly positioning the drive pin prior to insertion.

Owing to the special constructions of the bracket member and the pin-insertion type fasteners described above, the fitting holes 20 to be formed at the corresponding positions on the panel $P_1$ for receiving and retaining in position the fasteners 15 can be made as blind holes as illustrated.

Now the state which the bracket of this invention assumes upon completion of the attachment thereof to the panel $P_1$ will be described with reference to FIG. 6. The bracket member 10 is placed so that the base plate portions 13 thereof will rest stably on the surface of the panel $P_1$ and the through holes 14 in the base plate portions will correctly register with the blind holes 20 formed in the panel $P_1$ in substantially the same diameter as the through holes. Thereafter, the fasteners 15 are inserted into the blind holes 20. Then, with the flanges 16 of the fasteners resting stably on the surface of the base plate portions, the drive pins 19 are pushed or hammered down. As the drive pin is slid on the overall inner wall 17b of the barrel portion 17 which has the inside diameter thereof gradually decreased downwardly, the barrel elements 17a are radially diverged, with the result that the overall peripheral surface of the barrel portion is brought into fast frictional engagement with the inner wall surface of the fitting holes 20 on the panel $P_1$ side. The force of this frictional engagement serves the purpose of securing the bracket member 10 to the panel $P_1$.

As is evident from the arrangement described above, the fitting holes 20 can be blind because the fitting work is performed from only one side of the panel and further because the depth of the blind holes has only to meet the requirement that the cavities of the blind holes 15 neatly accommodate the leading end portions of the fasteners 15 protruding into the blind holes after the drive pins have been driven home therein. Of course, the length of the fasteners can be suitably determined so as to give necessary and sufficient peripheral length.

The length of the drive pins similarly can be suitably determined so as to satisfy the requirement that the rear end surfaces of the drive pins fall flush with the front surface of the flanges 16 after the drive pins have been driven home in the perforations 18. No part of the drive pins, therefore, protrude unnecessarily or undisirably from the surface.

The fact that the fitting holes 20 on the panel $P_1$ can be formed blind has a beneficial result that the aforementioned application of a decorative sheet 9 to the surface of the panel $P_1$ produces a beautiful finish free from surface irregularities. It has an additional advantage that the decorative sheet 9 can be formed integrally with the panel $P_1$ in advance to the panel-to-panel union and the steps of work involved in the assembly operation can be performed in a freely selected, rational sequence instead of a rigidly fixed sequence.

Further, even when the panel $P_1$ is made of a locally weak material, the bracket of this invention enables the panel to withstand easily and sufficiently the considerable stress developed between the panel $P_1$ and the panel fastener (which may be the same as the panel-to-panel fastener already described with reference to FIGS. 1-2 and which is indicated in a chain line as 21 in FIG. 6) to be attached to the seat portion 12 as described afterward.

In the first place, the stress which is exerted on the panel fastener 21 is eventually transformed into a force which affects the force of frictional engagement between the peripheral surfaces of the fasteners attached to the bracket member and the inner wall surfaces of the fitting holes. In the type of engagement under discussion, the area in which the peripheral surfaces of the fasteners come into direct contact with the inner wall surfaces of the fitting holes can be made as great as is desired. Unlike the severely limited area in which the head of the fastener comes into contact with the seat portion lying underneath in the conventional panel-to-panel construction, this amply large area of contact has a notable advantage that the stress is effectively dispersed and the panel is consequently allowed to withstand the considerable stress.

It is further evident from the embodiment described above that the number of base plate portions 13 can be freely increased and the area of each of the plurality of base plate portions 13 can be enlarged with reference to the sole seat portion 12. In this case, the bracket member can be attached to the panel by insertion of as many fitting fasteners 15 into the fitting holes of the base plate portions 13. As a result, the degree to which the stress exerted upon the panel fastener 21 can be dispersed increases with the increasing number of the fitting fasteners 15 used for securing the bracket member to the panel, meaning that the force which each of the fasteners 15 is required to withstand is proportionately decreased. This fact implies that the panel which is also exposed to the aforementioned force may be formed of a relatively weak material. In fact, the bracket of this invention can be expected to aid in producing ample fastening force when it is applied to a trim board of the type which, as illustrated, is composed of a plastic board 22 disposed to form an open side for contact with the bracket member 10 and a foamed board 23 attached in advance to the other side of the plastic board 22 (with a decorative sheet 9 attached to the remaining side of the aforementioned foamed board 23) and which has recently come to be popularly used as the panel $P_1$. It should be noted that use of just one fastener 15 may suffice where the panel possesses relatively high rigidity.

The panel of the construction described above fulfills its purpose more advantageously when radially projecting portions 24 adapted to be engaged with the reverse side of the plastic board 22 and thrust into the foamed board 23 forming the second layer of the panel are provided at the leading ends of the barrel elements 17a of the fitting fasteners 15. In case where the panel $P_1$ is composed of one kind of board (inclusive of the panel made of hardboard selected with a view to the aforementioned effect of the blind hole construction), these projecting portions 24 find no use because the engagement between the overall peripheral surface of the barrel elements and the inner wall surface of the fitting hole is the main object. In this sense, the overall peripheral surface of the barrel elements 17a which functions as the main part of engagement in the pin-insertion type fastener 15 is desired to be formed in a serrated shape 25, as seen in FIG. 7, relative to the axial direction because the serrated peripheral surface gives a greater area for frictional engagement and provides more effective attachment to the inner wall surface of the fitting hole.

Any known pin-insertion type fastener can of course be suitably utilized for the purpose of the bracket of this invention as touched upon previously.

After the bracket member 10 has been secured to the panel $P_1$ as illustrated in FIG. 6, the subsequent attachment of the second panel $P_2$ to the first panel $P_1$ is accomplished by simply causing the head portion 1 of the panel fastener 21 to be brought into fast engagement with the seat portion 12.

The engaging hole 11 to be used for this purpose has only to meet the requirement that it should possess a shape suitable for receiving and retaining in position the head portion 1 of the fastener. Although the present invention does not contemplate directly defining this particular shape, in the illustrated embodiment which assumes use of the fastener of the construction shown in FIGS. 1-2, the engaging hole 11 is formed in the shape of a keyhole comprising an inlet channel 11a of a width slightly smaller than the diameter of the neck portion 1a immediately below the head portion of the fastener and a central opening 11b continuing from the inlet channel and having a diameter greater than the diameter of the neck portion and smaller than the diameter of the head portion to prevent passage of the head portion therethrough. Once the neck portion 1a is forcibly passed through the inlet channel 11a and received in the central opening 11b, the neck portion 1a is kept in position inside the central opening 11b unless it is exposed to some external force applied thereto for the purpose of removal. As the result, the head portion 1 is effectively engaged with the seat surface (the surface opposed to the head portion) of the seat portion 12.

In this case, the seat portion 12 rises from the base plate portion 13 so as to admit the head portion which is now kept in engagement. If a recess sufficient for admitting the head portion is formed in advance in the panel P₁ and the fastener 21 is attached to the seat portion 12 prior to the attachment of the bracket member 10 to the panel P₁, then the base plate portions 13 and the seat portion 12 may be formed in one flat plate.

As described in detail above, the present invention causes the seat (bracket) which serves the purpose of receiving and retaining in position the head portion of the panel fastener being used for joining two panels or other similar articles to be separately formed of a rigid material in a construction such that it will be attached to the panel through the medium of pin-insertion type fasteners. The bracket, therefore, manifests its effect advantageously in fulfilling the objects of this invention and helps to find additional uses for the panel-to-panel fasteners.

What is claimed is:

1. As assembly of a panel to a support wherein said panel includes a laminate of an outer trim surface member, an intermediate locally weak plastic material and a semi-rigid backing member having a predetermined thickness, said backing member having a plurality of apertures each of which communicates coaxially with a blind bore in said plastic material having an axial extent less than the thickness of said plastic material, at least one bracket attached to said panel, rivets for fastening said bracket to said panel, and at least one panel fastener held by each said bracket and securing said panel relative to said support, each said bracket comprising a substantially rigid seat portion spaced from said backing member and apertured base plate portions have a predetermined thickness in intimate contact with the backing member, each of the apertures in said base portion being aligned with an aperture in said backing member, each of said rivets including a head, a shank, a through bore extending through said head and shank, and a drive pin, said hollow shank being bifurcated to provide at least two moveable legs each of which adjacent its free end carries radially outwardly extending shoulder means, said shoulder means being spaced from said head a distance substantially equal to the sum of the predetermined thicknesses of said bracket and said backing member, whereby when the pin is axially driven between said legs said shoulder means are moved laterally into said weak plastic to thereby accomodate said shoulder means in underlying relation to said backing member in opposition to said head without distortion of said trim surface member, said at least one panel fastener including head means cooperating complimentarily with said bracket seat and said fastener further including snap engaging shank means engaging said support to retain said panel relative to said support without distortion of said trim surface member.

2. An assembly of the type claimed in claim 1 wherein said bracket is metallic and includes a central portion positioned in one plane and laterally extending side portions disposed in a second plane spaced from said first plane, said central portion having a centrally disposed aperture and slot means communicating between said aperture and an edge of said central portion to provide access for installation of said panel fastener in said bracket with the head of said panel fastener generally disposed between said planes.

* * * * *